United States Patent
Krishnamurthy et al.

(10) Patent No.: US 8,987,438 B2
(45) Date of Patent: Mar. 24, 2015

(54) METHOD FOR MAKING DERIVATIZED GUAR GUM AND DERIVATIZED GUAR GUM MADE THEREBY

(75) Inventors: Shanmuganandamurthy Krishnamurthy, Plainsboro, NJ (US); Kraig Luczak, Cranbury, NJ (US)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 11/880,200

(22) Filed: Jul. 20, 2007

(65) Prior Publication Data
US 2008/0033163 A1   Feb. 7, 2008

Related U.S. Application Data

(60) Provisional application No. 60/832,217, filed on Jul. 20, 2006, provisional application No. 60/859,912, filed on Nov. 17, 2006.

(51) Int. Cl.
*C08B 37/00* (2006.01)
*C08L 5/00* (2006.01)

(52) U.S. Cl.
CPC .............. *C08L 5/00* (2013.01); *C08B 37/0096* (2013.01)
USPC ....................................... 536/114

(58) Field of Classification Search
CPC ................................................ C08B 37/0096
See application file for complete search history.

(56) References Cited

U.S. PATENT DOCUMENTS

| | | | |
|---|---|---|---|
| 3,483,121 A | 12/1969 | Jordan | ......................... 252/8.55 |
| 3,498,912 A | 3/1970 | Kieper et al. | ................... 210/49 |
| 3,740,388 A | 6/1973 | Montgomery et al. | ... 260/209 R |
| 3,912,713 A | 10/1975 | Boonstra et al. | |
| 4,946,618 A * | 8/1990 | Knochel et al. | ................ 510/151 |
| 4,959,464 A * | 9/1990 | Yeh | ................................ 536/114 |
| 5,489,674 A | 2/1996 | Yeh et al. | |
| 5,536,825 A * | 7/1996 | Yeh et al. | ......................... 536/52 |
| 5,733,854 A * | 3/1998 | Chowdhary et al. | .......... 510/121 |
| 5,756,720 A | 5/1998 | Chowdhary | ................... 536/124 |
| 5,997,907 A | 12/1999 | Goswami et al. | ............. 424/500 |
| 6,048,563 A | 4/2000 | Swartz et al. | .................. 426/573 |
| 2006/0068994 A1* | 3/2006 | Kesavan et al. | ............... 507/110 |

OTHER PUBLICATIONS

Colorado University of Boulder Organic Chemistry Undergraduate Courses: Lab Techniques, "Separatory Funnel Extraction Procedure", published 2001, last viewed Dec. 15, 2009; also available at http://orgchem.colorado.edu/hndbksupport/ext/extprocedure.html.*
MIT "7.4 Extraction and Washing Guide", published Oct. 2005, last viewed Dec. 15, 2009; also available at http://ocw.mit.edu/NR/rdonlyres/Chemistry/5-301January--IAP-2004/93204447-920B-45D5-A55B-B864B98D57DA/0/8_4_extraction_washing.pdf.*
Chudzikowski, R.J., J. Soc. Cosmet. Chem., "Guar gum and its applications", 1971, vol. 22, pp. 43-60.*

* cited by examiner

*Primary Examiner* — Layla Bland
*Assistant Examiner* — Bahar Craigo

(57) ABSTRACT

A method for making a derivatized guar, comprising: (a) contacting derivatized guar splits, which have not been treated with a boron compound to crosslink the guar splits, with an aqueous wash medium comprising, based on 100 parts by weight of the aqueous wash medium: (i) from about 0.1 to about 30 parts by weight of a water soluble non-boron salt, or (ii) less than about 0.1 parts by weight water soluble salt, and (b) separating the washed derivatized guar splits from the aqueous wash medium, provided that the contacting of the derivatized guar splits with the aqueous wash medium comprising less than about 0.1 parts by weight water soluble salt is limited to a duration effective to maintain the water content of the washed derivatized guar splits at less than or equal to about 80 percent by weight.

4 Claims, No Drawings

METHOD FOR MAKING DERIVATIZED GUAR GUM AND DERIVATIZED GUAR GUM MADE THEREBY

This application claims the benefit of U.S. Provisional Application No. 60/832,217, filed Jul. 20, 2006, and U.S. Provisional Application No. 60/859,912 filed Nov. 17, 2006.

FIELD OF THE INVENTION

This invention relates to a method for making derivatized guar gum and derivatized guar gum made thereby.

BACKGROUND OF THE INVENTION

Derivatized guar gums, such as carboxyl methyl guar gum, hydroxypropyl guar gum, and hydroxypropyl trimethylammonium guar gum, are commercially available materials used in a variety of applications, including as ingredients in personal care compositions, and are typically made by a "water-splits" process, wherein material, known as guar "splits", derived from guar seeds undergoes reaction with a derivatizing agent in an aqueous medium.

Borax (sodium tetra borate) is commonly used as a processing aid in the reaction step of the water-splits process to partially crosslink the surface of the guar splits and thereby reduces the amount of water absorbed by the guar splits during washing. The borate crosslinking takes place under alkaline conditions and is reversible allowing the product to hydrate under acidic conditions. Maintaining the moisture content of the derivatized splits at a relatively low level, typically a moisture content of less than or equal to about 90 percent by weight, simplifies handling and milling of the washed derivatized splits. In the absence of crosslinking, the moisture content of washed derivatized splits is relatively high and handling and further processing of the high moisture content splits is difficult.

However, due to regulatory concerns regarding the boron content of materials used in personal care applications, it has now become desirable to make derivatized guar without using any boron-containing crosslinker.

What is needed is an economically attractive approach to controlling water content of washed cationic guar splits, without requiring that the cationic guar splits first be crosslinked.

SUMMARY OF THE INVENTION

In a first aspect, the present invention is directed to a method for making a derivatized guar, comprising:
(a) contacting derivatized guar splits, which have not been treated with a boron compound to crosslink the guar splits, with an aqueous wash medium comprising, based on 100 parts by weight of the aqueous wash medium:
  (i) from about 0.1 to about 30 parts by weight of a water soluble non-boron salt, or
  (ii) less than about 0.1 parts by weight water soluble salt, and
(b) separating the washed derivatized guar splits from the aqueous wash medium, provided that the contacting of the derivatized guar splits with the aqueous wash medium comprising less than about 0.1 parts by weight water soluble salt is limited to a duration effective to maintain the water content of the washed derivatized guar splits at less than or equal to about 90 percent by weight.

In one embodiment, the present invention is directed to a method for making a derivatized guar, comprising contacting derivatized guar splits, which have not been treated with a boron compound to crosslink the guar splits, with an aqueous salt solution comprising, based on 100 parts by weight of the salt solution, from about 0.1 to about 30 parts by weight of a water soluble non-boron salt.

The water content of derivatized guar splits that have been washed according with the above-described method is typically less than or equal to about 90 percent by weight ("wt %"), more typically less than about 80 wt %, in the absence of boron crosslinking, more typically in the absence of any ionic crosslinking.

In a second aspect, the present invention is directed to a derivatized guar made by the above-disclosed method.

In third aspect, the present invention is directed to a method for making a derivatized guar, comprising:
reacting guar splits with a derivatizing reagent under appropriate reaction conditions to produce derivatized guar splits, wherein neither the guar splits nor the derivatized guar splits are treated with a boron compound to crosslink the guar splits or derivatized guar splits, and
contacting the derivatized guar splits with an aqueous salt solution comprising, based on 100 parts by weight of the salt solution, from about 0.1 to about 30 parts by weight of a water soluble non-boron salt.

In a fourth aspect, the present invention is directed to a personal care composition comprising a derivatized guar made by the above described method.

In a fifth aspect, the present invention is directed to a derivatized guar gum, comprising a galactomannan polysaccharide substituted at one or more sites of the polysaccharide with a substituent that is independently selected for each site from the group consisting of cationic substituent groups, nonionic substituent groups, and anionic substituent groups, said derivatized guar gum being at least substantially boron free and capable of rapid hydration in an aqueous medium having a pH of greater than or equal to 7 to form an at least substantially homogeneous solution.

In a sixth aspect, the present invention is directed to a personal care composition comprising a derivatized guar according to the present invention.

DETAILED DESCRIPTION OF INVENTION AND PREFERRED EMBODIMENTS

In one embodiment, cationic guar made according to the method of the present invention has no intentionally added boron, but may comprise boron introduced as impurities in the raw materials, for example, as a naturally occurring component of guar splits, or process fluids used in the method.

As used herein, the terminology "aqueous medium" generally means a liquid medium that contains water, typically greater than or equal to 25 wt % water, more typically greater than or equal to 50 wt % water, even more typically greater than or equal to 75 wt % water and less than 75 wt %, more typically less than 50 wt %, and even more typically less than 25 wt % of one or more water miscible organic liquids, such as for example, an alcohol, such as ethanol or propanol, and may, optionally contain one or more solutes dissolved in the aqueous medium. In one embodiment, the liquid portion of an aqueous medium consists essentially of water. In another embodiment, the liquid portion of an aqueous medium consists solely of water. As used herein the terminology "aqueous solution" refers more specifically to an aqueous medium that further comprises one or more solutes dissolved in the aqueous medium.

As used herein in reference to a material, the term "at least substantially boron free" means, that the boron content of the material, as determined by mass spectroscopy, is less than about 50 parts per million (ppm") boron, that is, less than about 50 parts by weight boron per one million parts by weigh of the material, more typically less than about 20 ppm, and even more typically less than 5 ppm.

As used herein, the terminology "non-boron salt" or "non-boron anion" means, respectively, any organic or inorganic salt or anion that does not contain boron as an element in its chemical formula.

Suitable non-boron salts include alkali metal, alkali earth, and transition metal salts of halides or of polyatomic non-boron anions. More typically, the non-boron salt comprises a monovalent or polyvalent alkali metal, alkali earth, or transition metal cation and a halide, hydroxyl, carbonate, bicarbonate, sulfate, bisulfate, phosphate, or nitrate anion.

In one embodiment, the cation of the non-boron salt is $Na^+$, $K^+$, $Ca^{+2}$, $Mg^{+2}$, $Zn^{+2}$, $Mn^{+2}$, $Cu^{+2}$, $Al^{+3}$, $Fe^{3+}$, $Sb^3$, $Ti^{+4}$, $Zr^{+4}$, or $NH_4^+$, more typically, $Na^+$, $K^+$, $Ca^{+2}$, or $Mg^{+2}$, most typically, a monovalent cation such as $Na^+$ or $K^+$.

In one embodiment, the anion of the non-boron salt is a chloro, hydroxyl, carbonate, bicarbonate, sulfate, bisulfate, phosphate, or nitrate anion.

In one embodiment, the salt is potassium chloride or sodium chloride, more typically, sodium chloride.

Guar gum refers to the mucilage found in the seed of the leguminous plant *Cyamopsis tetragonolobus*. The water soluble fraction (85%) is called "guaran," which consists of linear chains of (1,4)-β-D mannopyranosyl units—with α-D-galactopyranosyl units attached by (1,6) linkages. The ratio of D-galactose to D-mannose in guaran is about 1:2. Guar gum typically has a weight average molecular weight of between 2,000,000 and 5,000,000 Daltons.

Guar seeds are composed of a pair of tough, non-brittle endosperm sections, hereafter referred to as "guar splits," between which is sandwiched the brittle embryo (germ). After dehulling, the seeds are split, the germ (43-47% of the seed) is removed by screening. The splits typically contain about 78-82% galactomannan polysaccharide and minor amounts of some proteinaceous material, inorganic salts, water-insoluble gum, and cell membranes, as well as some residual seedcoat and seed embryo.

Processes for making derivatives of guar gum splits are generally known. Typically, guar splits are reacted with one or more derivatizing agents under appropriate reaction conditions to produce a guar polysaccharide having the desired substituent groups. Suitable derivatizing reagents are commercially available and typically contain a reactive functional group, such as an epoxy group, a chlorohydrin group, or an ethylenically unsaturated group, and at least one other substituent group, such as a cationic, nonionic or anionic substituent group, or a precursor of such a substituent group per molecule, wherein substituent group may be linked to the reactive functional group of the derivatizing agent by bivalent linking group, such as an alkylene or oxyalkylene group. Suitable cationic substituent groups include primary, secondary, or tertiary amino groups or quaternary ammonium, sulfonium, or phosphinium groups. Suitable nonionic substituent groups include hydroxyalkyl groups, such as hydroxypropyl groups. Suitable anionic groups include carboxyalkyl groups, such as carboxymethyl groups. The cationic, nonionic and/or anionic substituent groups may be introduced to the guar polysaccharide chains via a series of reactions or by simultaneous reactions with the respective appropriate derivatizing agents.

In one embodiment, the guar splits are reacted with an alkylene oxide derivatizing agent, such as ethylene oxide, propylene oxide, or butylene oxide, under known alkoxylation conditions to add hydroxyalkyl and/or poly(alkyleneoxy) substituent groups to the guar polysaccharide chains.

In one embodiment, the guar splits are reacted with a carboxylic acid derivatizing agent, such as sodium monochloroacetate, under known esterification conditions to add carboxyalkyl groups to the guar polysaccharide chains.

In one embodiment, the derivatizing agent comprises a cationic substituent group that comprises a cationic nitrogen radical, more typically, a quaternary ammonium radical. Typical quaternary ammonium radicals are trialkylammonium radicals, such as trimethylammonium radicals, triethylammonium radicals, tributylammonium radicals, aryidialkylammonium radicals, such as benzyldimethylammonium radicals, radicals, and ammonium radicals in which the nitrogen atom is a member of a ring structure, such as pyridinium radicals and imidazoline radicals, each in combination with a counterion, typically a chloride, bromide, or iodide counterion. In one embodiment, the cationic substituent group is linked to the reactive functional group of the cationizing agent by an alkylene or oxyalkylene linking group.

Suitable cationizing reagents include, for example:

epoxy-functional cationic nitrogen compounds, such as, for example, 2,3-epoxypropyltrimethylammonium chloride chlorohydrin-functional cationic nitrogen compounds, such as, for example, 3-chloro-2-hydroxypropyl trimethylammonium chloride, 3-chloro-2-hydroxypropyl-lauryldimethylammonium chloride, 3-chloro-2-hydroxypropyl-stearyldimethylammonium chloride, and vinyl-, or (meth)acrylamide-functional nitrogen compounds, such as methacrylamidopropyl trimethylammonium chloride.

In one embodiment, the guar splits are reacted with a chlorohydrin-functional quaternary ammonium compound in the presence of base, in an aqueous medium under relatively mild conditions, such as heating to a temperature of 40° C. to 70° C., to produce cationic guar splits, that is, derivatized guar splits having cationic functional groups.

In one embodiment, the derivatized guar splits comprise molecules of guar having one or more substituent groups per molecule of guar, wherein at least a portion of the substituent groups have been added by reaction of guar splits with one or more derivatizing agents in an aqueous medium under appropriate reaction conditions.

In one embodiment, the derivatized guar splits comprise molecules of guar having one or more substituent groups per molecule of guar, wherein all or substantially all of the substituent groups have been added by reaction of guar splits with one or more derivatizing agents in an aqueous medium under appropriate reaction conditions in one or more derivatization reaction steps.

In one embodiment, the derivatized guar splits comprise molecules of guar having one or more substituent groups per molecule of guar, wherein a first portion of the substituent groups have been added by reaction of guar splits with one or more first derivatizing agents under appropriate reaction conditions in a first liquid medium, and a second portion of the substituent groups have been added by reaction of the guar splits with one or more second derivatizing agents in a second liquid medium under appropriate reaction conditions, wherein at least one of the first liquid medium and the second liquid medium is an aqueous medium.

In one embodiment, the first and second liquid media are each aqueous media. In one embodiment, the first and second liquid media are each the same aqueous medium. In an embodiment wherein the first and second liquid media are the same aqueous medium, the derivatization reactions with the first and second derivatizing agents may be conducted concurrently or in series in the same aqueous medium.

In one embodiment, one of the first and second liquid media is an aqueous medium and the other of the first and second liquid media is a liquid medium other than an aqueous medium and the derivatization reaction in the first liquid medium is conducted prior to the derivatization reaction in the second liquid medium. In one embodiment, the first liquid medium is an aqueous medium and the second liquid medium is a liquid medium other than an aqueous medium, such as, for example, a polar organic solvent, more typically, a water miscible organic solvent. In one embodiment, the first liquid medium is a liquid medium other than an aqueous medium and the second liquid medium is an aqueous medium.

Typically, the derivatized guar splits produced by reaction of guar splits with a derivatizing agent in an aqueous medium are in the form of water-swollen gum comprising from about 30 to 60 parts by weight ("pbw"), more typically from 30 to 50 pbw, cationic guar splits and 40 to 70 pbw, more typically 50 to 70 pbw, water per 100 pbw of water-swollen gum.

In one embodiment, the step of contacting the derivatized guar splits with the aqueous wash medium is conducted subsequent to the step of by reaction of guar splits with a derivatizing agent in an aqueous reaction medium under appropriate reaction conditions. More typically, the water-swollen gum produced by reaction of guar splits with a derivatizing agent in an aqueous reaction medium is contacted with the aqueous wash medium.

In one embodiment, the derivatized guar splits are allowed to cool, typically to a temperature of less than or equal to about 50° C. prior to washing the derivatized guar splits.

In one embodiment, the derivatized guar splits are washed with the aqueous medium by contacting the derivatized guar splits with the aqueous medium and then physically separating the aqueous wash medium, in the form of an aqueous rinse solution, from the derivatized guar splits, wherein the contacting and separating steps taken together constitute one "wash step". As used herein, the terminology "high salt aqueous wash medium" means an aqueous wash medium comprising from about 0.1 to about 30 pbw of a water soluble non-boron salt, the terminology "low salt aqueous wash medium" means an aqueous wash medium comprising less than about 0.1 pbw water soluble salt, the terminology "high salt wash step" means a wash step using a high salt aqueous wash medium as the aqueous wash medium, and a "low salt wash medium" means a wash step using a low salt aqueous wash medium as the aqueous wash medium.

One or more wash steps are conducted in any suitable process vessel. Each wash step may be conducted as a batch process, such as for example, in a stirred mixing vessel, or as a continuous process, such as for example, in a column wherein a stream of the derivatized guar splits is contacted with a co-current or counter-current stream of aqueous wash medium.

In one embodiment, the derivatized guar splits are washed with aqueous wash medium in one wash step.

In one embodiment, the derivatized guar splits are washed with aqueous wash medium in two wash steps.

In one embodiment, the derivatized guar splits are washed with aqueous wash medium in three wash steps.

In one embodiment, the derivatized guar splits are washed with aqueous wash medium in four wash steps.

In one embodiment, the derivatized guar splits are washed with aqueous wash medium in five wash steps.

In one embodiment, the derivatized guar splits are washed with aqueous wash medium in six wash steps.

In one embodiment, the derivatized guars splits are subjected to at least two high salt wash steps, more typically at least two successive high salt wash steps, even more typically, to two successive high salt wash steps.

In one embodiment, the derivatized guars splits are subjected to at least one low salt wash step, more typically at least two successive low salt wash steps.

In one embodiment, the derivatized guar splits are subjected to two successive low salt wash steps.

In one embodiment, the derivatized guar splits are subjected to three successive low salt wash steps.

In one embodiment, the derivatized guar splits are subjected to four successive low salt wash steps.

In one embodiment, the derivatized guars splits are subjected to at least one high salt wash step followed by at least one low salt wash step, more typically, to one high salt wash step followed by one low salt wash step.

In one embodiment, a high salt wash medium is generated in situ by adding to the reaction medium in which the guar splits are derivatized or to the derivatized guar splits an amount of salt effective to, upon dilution with an aqueous wash medium in a wash step, provide an aqueous wash medium having a salt content of from about 0.1 to about 30 pbw. The salt may be added to the derivatized guar in any convenient manner, such as for example, as a dry ingredient, an aqueous slurry, or a concentrated aqueous solution.

In one embodiment, the aqueous wash medium comprises from about 0.5 to about 10, more typically from about 1 to about 8 pbw, of non-boron salt and from 90 to 99.5 pbw, more typically from about 92 to about 99 pbw of a liquid medium per 100 pbw of salt solution. In one embodiment, the aqueous wash medium contains no intentionally added boron-containing salts or other boron-containing compounds. In one embodiment, the salt solution is substantially boron free.

In one embodiment, the aqueous wash medium comprises water, and, optionally, up to 25 pbw water miscible organic liquid per 100 pbw of aqueous medium. Suitable water miscible organic liquids include, for example, alcohols such as methanol or ethanol. More typically, the aqueous wash medium consists essentially of water, even more typically, of deionized water.

In one embodiment, the derivatized guar splits is contacted with from about 2 to about 30 kilograms ("kg"), more typically from about 5 to about 20 kg, even more typically from about 5 to about 15 kg, of aqueous wash medium per kg of derivatized guar splits solids per wash step.

In one embodiment, a high salt wash step comprises contacting the derivatized guar splits with a high salt aqueous wash medium for a contact time of up to about 30 minutes, more typically from about 30 seconds to about 15 minutes, even more typically from about 1 minute to about 8 minutes, per high salt wash step.

In one embodiment, low salt wash step comprises contacting the derivatized guar splits with a low salt aqueous wash medium for a contact time of less than or equal to about 15 minutes, more typically from about 10 seconds to about 10 minutes, even more typically from about 20 seconds to about 8 minutes, and still more typically from about 30 seconds to about 5 minutes, per low salt wash step.

The washed derivatized splits are separated from the aqueous wash medium by any suitable dewatering means such as for example, filtration and/or centrifugation. In one embodiment, the washed derivatized splits are separated from the wash liquid by centrifugation.

In one embodiment, the dewatered derivatized splits have a water content of less than or equal to about 90%, more typically less than or equal to about 85 wt % and even more typically less than or equal to about 80 wt %.

The dewatered derivatized guar splits are dried and ground to produce derivatized guar particles.

In one embodiment, the derivatized guar splits are dried by any suitable drying means, such as, for example, air drying, fluid bed drying, flash grinding, freeze drying, to a moisture content of less than or equal to about 20 wt %, more typically less than or equal to about 15 wt %.

In one embodiment the dried derivatized guar splits are ground by any suitable particle size reduction means, such as, for example, a grinding mill. In one embodiment the guar splits are simultaneously dried and ground in a "flash milling" procedure, wherein a stream of guar splits and a stream of heated air are simultaneously introduced into a grinding mill.

In one embodiment, the derivatized guar gum according to the present invention comprises a galactomannan polysaccharide that is substituted at one or more sites of the polysaccharide with a substituent group that is independently selected for each site from the group consisting of cationic substituent groups, nonionic substituent groups, and anionic substituent groups.

In one embodiment, the derivatized guar gum according to the present invention is selected from hydroxypropyl trimethylammonium guar, hydroxypropyl lauryldimethylammonium guar, hydroxypropyl stearyldimethylammonium guar, hydroxypropyl guar, carboxymethyl guar, guar with hydroxypropyl groups and hydroxypropyl trimethylammonium groups, and mixtures thereof.

In one embodiment, the derivatized guar gum according to the present invention exhibits a total degree of substitution ("$DS_T$") of from about 0.001 to about 3.0, wherein:

$DS_T$ is the sum of the DS for cationic substituent groups ("$DS_{cationic}$"), the DS for nonionic substituent groups ("$DS_{nonionic}$") and the DS for anionic substituent groups ("$DS_{anionic}$"), $DS_{cationic}$ is from 0 to about 3, more typically from about 0.001 to about 2.0, and even more typically from about 0.001 to about 1.0, $DS_{nonionic}$ is from 0 to 3.0, more typically from about 0.001 to about 2.5, and even more typically from about 0.001 to about 1.0, and $DS_{anionic}$ is from 0 to 3.0, more typically from about 0.001 to about 2.0.

In one embodiment, a 1% solution of the derivatized guar gum according to the present invention in deionized water exhibits a viscosity of from about 200 to 6000 centiPoise ("cP"), more typically from about 1000 to about 5000 cP, as measured using a Brookfield RVT viscometer (Brookfield Engineering Laboratories Inc. Middleboro, Mass.).

In one embodiment, the derivatized guar according to the present invention ranges from an undetectably low amount to about 50 ppm, more typically from an undetectably low amount to about 20 ppm, boron, as measured by mass spectroscopy.

In one embodiment, the particles of derivatized guar according to the present invention have an average mean particle size ("$D_{50}$") of from about 10 to about 300 micrometers ("μm"), more typically from about 20 to about 200 μm, as measured by light scattering.

A derivatized guar gum according to the present invention is capable of being hydrated in an aqueous medium at an elevated pH more rapidly than an analogous derivatized guar gum made using a crosslinker as a processing aid. The ability to rapidly hydrate the guar gum allows such gum to dissolve more quickly upon dispersion of the particulate gum in an aqueous medium and thus to be added to the aqueous medium more efficiently by allowing faster processing, for example, by reducing the contact time with the aqueous medium required to achieve hydration of the gum, and/or the use of less aggressive processing conditions, such as, for example, mixing with less agitation, and/or the use of simpler and less expensive processing equipment, such as, for example, less powerful agitation equipment. Compared to a derivatized guar gum according to the present invention, an analogous derivatized guar gum made using a crosslinker as a processing aid is more difficult to hydrate and has, upon introduction of particulate guar gum to an aqueous medium, a greater tendency to undesirably coalesce into gelatinous aggregates of particles. Such aggregates remain resistant to dissolution, may remain as a separate phase in the aqueous medium after even a prolonged period of mixing, and partition from the aqueous medium as a separate gelatinous phase, after cessation of mixing.

The rate at which the derivatized guar gum according to the present invention is capable of hydration is generally insensitive to pH. Typically, the derivatized guar gum according to the present invention is capable of rapid hydration in an aqueous medium over a broad range of pH. Derivatized guar gum made using a crosslinker as a processing aid are typically hydrated by introduced into an aqueous medium having a pH of less than 7, more typically less than 6. In contrast, derivatized guar gum according to the present invention is capable of rapid hydration even at an elevated pH. As used herein, the terminology "elevated pH" means having a pH of greater than or equal to 7, more typically greater than or equal to 7.5, even more typically greater than or equal to 8, still more typically greater than or equal to 8.5, and still more typically greater than or equal to 9, to form a substantially homogeneous solution of the gum. As used herein, the terminology "at least substantially homogeneous solution" means an aqueous mixture comprising the gum that appears, by visual examination, to be a single phase.

Rapid hydration in an aqueous medium at an elevated pH may be demonstrated by stirring a mixture of 1 wt % of the derivatized guar gum according to the present invention and water. In one embodiment, the derivatized guar gum according to the present invention is capable of forming a substantially homogeneous solution at an elevated pH by stirring a mixture of water and 1 wt % of the guar gum for less than or equal to 8 hours, more typically, less than or equal to 4 hours, and even more typically, less than or equal to 2 hours.

In one embodiment, the derivatized guar gum according to the present invention is capable, upon stirring a mixture of water and 1 wt % of the guar gum at an elevated pH for less than or equal to 2 hours, of forming a substantially homogeneous solution having a viscosity of greater than 500 milli-Pascal seconds ("mPa·s"), more typically 1000 mPa·s, and still more typically 1500 mPa·s.

The derivatized guar gum according to the present invention is useful in personal care applications, such as, for example, shampoos, body washes, hand soaps, lotions, creams, conditioners, shaving products, facial washes, neutralizing shampoos, personal wipes, and skin treatments.

In one embodiment, the personal care composition of the present invention comprises a derivatized guar according to the present invention and one or more "benefit agents" that is, materials known in the art that provide a personal care benefit, such as moisturizing or conditioning, to the user of the personal care composition, such as, for example, cleansing agents such as anionic surfactants, cationic surfactants, amphoteric surfactants, zwitterionic surfactants and nonionic surfactants, as well as emollients, moisturizers, conditioners, polymers, vitamins, abrasives, UV absorbers, antimicrobial agents, anti-dandruff agents, fragrances, depigmentation agents, reflectants, thickening agents, detangling/wet combing agents, film forming polymers, humectants, amino acid agents, antimicrobial agents, allergy inhibitors, anti-acne agents, anti-aging agents, anti-wrinkling agents, antiseptics, analgesics, antitussives, antipruritics, local anesthetics, anti-hair loss agents, hair growth promoting agents, hair growth inhibitor agents, antihistamines, antiinfectives, inflammation inhibitors, anti-emetics, anticholinergics, vasoconstrictors, vasodilators, wound healing promoters, peptides, polypeptides and proteins, deodorants and anti-perspirants, medicament agents, hair softeners, tanning agents, skin lightening agents, depilating agents, shaving preparations, external analgesics, counterirritants, hemorrhoidals, insecticides, poison ivy products, poison oak products, burn products, anti-diaper rash agents, prickly heat agents, make-up preparations, amino acids and their derivatives, herbal extracts, retinoids, flavoids, sensates, anti-oxidants, hair lighteners, cell turnover enhancers, coloring agents, and mixtures thereof.

In one embodiment, the derivatized guar gum according to the present invention aids in the delivery of the benefit agent onto and/or into the skin, hair, and/or nails.

In one embodiment, the personal care composition according to the present invention is an aqueous composition that comprises, based on 100 pbw of the composition:

(a) greater than about 0.001 pbw, more typically from about 0.01 to about 0.8 pbw, and even more typically from about 0.1 to about 0.4 pbw, of a derivatized guar gum according to the present invention, and (b) greater than about 1 pbw, typically from about 5 to about 20 pbw, and even more typically from about 10 to about 15 pbw, of a surfactant selected from cationic surfactants, anionic surfactants, amphoteric surfactants, zwitterionic surfactants, nonionic surfactants, and mixtures thereof.

In one embodiment, the surfactant component (b) the personal care composition according to the present invention comprises a zwitterionic surfactant, more typically a zwitterionic surfactant selected from alkyl betaines and amidoalkylbetaines.

In one embodiment, the surfactant component (b) the personal care composition according to the present invention comprises a mixture of a zwitterionic surfactant, more typically a zwitterionic surfactant selected from alkyl betaines and amidoalkylbetaines, and an anionic surfactant, more typically selected from salts of alkyl sulfates and alkyl ether sulfates.

Cationic surfactants suitable for use in the personal care composition are well known in the art, and include, for example, quaternary ammonium surfactants and quaternary amine surfactants that are not only positively charged at the pH of the personal care composition, which generally is about pH 10 or lower, and soluble in the personal care composition. In one embodiment, the cationic surfactant comprises at least one n-acylamidopropyl dimethylamine oxide, such as cocamidopropylamine oxide.

Anionic surfactants suitable for use in the personal care composition are well known in the art, and include, for example, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium lauryl sarcosinate, sodium lauroyl sarcosinate, lauryl sarcosine, cocoyl sarcosine, ammonium cocoyl sulfate, ammonium lauroyl sulfate, sodium cocoyl sulfate, sodium lauroyl sulfate, potassium cocoyl sulfate, potassium lauryl sulfate, triethanolamine lauryl sulfate, triethanolamine lauryl sulfate, monoethanolamine cocoyl sulfate, monoethanolamine lauryl sulfate, sodium tridecyl benzene sulfonate, sodium dodecyl benzene sulfonate, and mixtures thereof.

Amphoteric surfactants suitable for use in the personal care composition are well known in the art, and include those surfactants broadly described as derivatives of aliphatic secondary and tertiary amines in which the aliphatic radical can be straight or branched chain and wherein one of the aliphatic substituents contains from about 8 to about 18 carbon atoms and one contains an anionic water solubilizing group such as carboxy, sulfonate, sulfate, phosphate, or phosphonate. In one embodiment, the amphoteric surfactant comprises at least one compound selected from cocoamphoacetate, cocoamphodiacetate, lauroamphoacetate, and lauroamphodiacetate.

Zwitterionic surfactants suitable for use in the personal care composition are well known in the art, and include, for example, those surfactants broadly described as derivatives of aliphatic quaternary ammonium, phosphonium, and sulfonium compounds, in which the aliphatic radicals can be straight or branched chain, and wherein one of the aliphatic substituents contains from about 8 to about 18 carbon atoms and one contains an anionic group such as carboxy, sulfonate, sulfate, phosphate or phosphonate. Specific examples of suitable Zwitterionic surfactants include alkyl betaines, such as cocodimethyl carboxymethyl betaine, lauryl dimethyl carboxymethyl betaine, lauryl dimethyl alpha-carboxy-ethyl betaine, cetyl dimethyl carboxymethyl betaine, lauryl bis-(2-hydroxy-ethyl)carboxy methyl betaine, stearyl bis-(2-hydroxy-propyl)carboxymethyl betaine, oleyl dimethyl gamma-carboxypropyl betaine, and lauryl bis-(2-hydroxypropyl)alpha-carboxyethyl betaine, amidopropyl betaines, and alkyl sultaines, such as cocodimethyl sulfopropyl betaine, stearyldimethyl sulfopropyl betaine, lauryl dimethyl sulfoethyl betaine, lauryl bis-(2-hydroxy-ethyl)sulfopropyl betaine, and alkylamidopropylhydroxy sultaines.

Nonionic surfactants suitable for use in the personal care composition are well known in the art, and include, for example, long chain alkyl glucosides having alkyl groups containing about 8 carbon atoms to about 22 carbon atoms, coconut fatty acid monoethanolamides such as cocamide MEA, coconut fatty acid diethanolamides, and mixtures thereof.

In one embodiment, the personal care composition further comprises a conditioning agent. Conditioning agents suitable for use in the personal care composition are well known in the art, and include any material which is used to give a particular conditioning benefit to hair and/or skin. In hair treatment compositions, suitable conditioning agents are those which deliver one or more benefits relating to shine, softness, antistatic properties, wet-handling, damage, manageability, body, and greasiness. Conditioning agents useful in personal care compositions according to the present invention typically comprise a water insoluble, water dispersible, non-volatile, liquid that forms emulsified, liquid particles or are solubilized by the surfactant micelles, in an anionic surfactant component, as described above and include those conditioning agents characterized generally as silicones, such as silicone oils, cationic silicones, silicone gums, high refractive silicones, and silicone resins, and organic conditioning oils, such as hydrocarbon oils, polyolefins, and fatty esters.

In one embodiment, the derivatized guar gum according to the present invention aids in the delivery of the conditioning agent onto and/or into the skin, hair, and/or nails.

The personal care composition according to the present invention may, optionally, further comprise other ingredients, in addition to benefit agents, such as, for example, preservatives such as benzyl alcohol, methyl paraben, propyl paraben, and imidazolidinyl urea, electrolytes, such as sodium chloride, sodium sulfate, and sodium citrate, thickeners, such as polyvinyl alcohol, pH adjusting agents such as citric acid and sodium hydroxide, pearlescent or opacifying agents, dyes, and sequestering agents, such as disodium ethylenediamine tetra-acetate.

Example 1-11 and Comparative Examples C1-C2

The derivatized guar gums of Examples 1 to 11 and Comparative Examples C1 and C2 were made as follows.

Guar splits were reacted with cationic derivatizing agent (3-chloro-2-hydroxypropyltrimethylammonium chloride, Quab™ 188 (65%), Dow) in an aqueous medium in the presence of base (NaOH) at about 50° C. under an inert atmosphere. The reactor contents were allowed to cool and a water-swollen gel of cationic guar was removed from the reactor.

The cationic guar was washed under a number of different washing conditions. Washing was done for 1, 2 or 3 minutes per wash for a total of 1, 2 or 3 washes per batch. The reacted splits were split into two samples A and B (approximately equal amount) for washing under different conditions. The wash ratio was 1:10 based on the starting (non-derivatized) splits. The washing was done either with DI water, or NaCl solution (2% or 5%), or both. The reacted splits were poured in to a beaker containing known amount of water under stirring with a magnetic bar. After the washing steps, the splits were filtered through a 180 μm mesh. The reacted splits were then dried in an Aeromatic™ fluid bed dryer (60 min, 60° C.). The dried splits were ground in a Retsch grinding mill in two passes, using a 1 mm screen for the first pass and a 0.12 mm screen for the second pass.

Results of the wash study are set forth in TABLE I below for the derivatized guar gums of Examples 1-11 and Comparative Examples C1-C2. The cationic guar splits content (wt %) and boron content (wt %) of the unwashed cationic splits, the wash composition (wt % of added ingredients) and duration (minutes) for each wash, the moisture content (wt %) of the washed splits following the filtering step, are given for each example. Several examples also include values for the viscosity of a 1% aqueous solution of the cationic guar, as measured using a Brookfield viscometer. The boron content of the cationic guar made with boron crosslinking agent, that is cationic guar analogous to that of Comparative Examples C1 and C2, is typically greater than or equal to about 100 ppm boron. The boron content of Examples 1-11 was, in each case, less than 3 ppm boron.

TABLE 1

| Ex # | Splits (wt %)/ borax (wt %) | Wash composition/duration: | | | Washed splits moisture content (%)/viscosity (cp) |
|---|---|---|---|---|---|
| | | Wash 1 | Wash 2 | Wash 3 | |
| 1 | 46/0 | 5% NaCl/ 2 min | DI water/ 2 min | — | 75.5/1252 |
| 2 | 46/0 | 5% NaCl/ 2 min | DI water/ 2 min | — | 76.5/— |
| 3 | 46/0 | 5% NaCl/ 2 min | DI water/ 2 min | DI water/ 2 min | 82.2/— |
| 4 | 46/0 | 5% NaCl/ 2 min | 5% NaCl/ 2 min | — | 72.4/— |
| 5 | 46/0 | 5% NaCl/ 2 min | 5% NaCl/ 2 min | — | 74.4/— |
| 6 | 50/0 | 2% NaCl/ 1 min | DI water/ 1 min | | 77.4/— |
| 7 | 50/0 | DI water/ 1 min | DI water/ 1 min | — | 77.4/— |
| 8 | 46/0 | DI water/ 2 min | DI water/ 2 min | — | 82.3/— |
| 9 | 46/0 | DI water/ 2 min | DI water/ 2 min | — | 81.7/1467 |
| 10 | 43/0 | DI water/ 3 min | DI water/ 3 min | — | 83.5/— |
| 11 | 43/0 | DI water/ 2 min | DI water/ 2 min | | 79.5/— |
| C1 | 46/0.13 | DI water/ 2 min | DI water/ 2 min | — | 63.3/1472 |
| C2 | 46/0.13 | 5% NaCl/ 2 min | DI water/ 2 min | — | 65.0/1209 |

Examples 12-18

The derivatized guar gums of Examples 12 to 18 were made as follows.

Guar splits were reacted with cationic derivatizing agent (3-chloro-2-hydroxypropyltrimethylammonium chloride, Quab™ 188 (65%), Dow) in an aqueous medium in the presence of base (NaOH) at about 50° C. under an inert atmosphere. The reactor contents were allowed to cool and a water-swollen gel of cationic guar was removed from the reactor.

The cationic guar was washed under a number of different washing conditions. Washing was done for 2 minutes per wash for a total of 2 washes per batch at a wash ratio of 1 pbw splits:10 pbw aqueous wash medium or 1 pbw splits:20 pbw aqueous wash medium, based on the weight of starting (non-derivatized) splits. The washing was done with DI water, aqueous 2% NaCl solution or both. For the composition of Example 16, a 2% NaCl wash solution was generated in situ by adding a NaCl brine (~26 wt % aqueous NaCl) to the derivatized splits prior to washing with DI water.

The derivatized splits were washed by contacting the derivatized splits with the aqueous wash medium noted in the TABLE II in a baffled, paddle agitated column for the contact time noted in the TABLE II and then separated from the aqueous wash medium by centrifugation at ~8000 revolutions per minute in a Sharples Penwalt Mark 3 centrifuge.

The washed derivatized splits were simultaneously dried and ground in a Micro Pulverizer Type 180B grinder equipped with a 0.020" round hole screen and a knife blade headliner and operated about 9100 rpm with a throughput of about 5 pounds per hour (inlet temperature of about 220° C., outlet temperature of about 550° C.).

Results of the wash study are set forth in TABLE II below for process Examples 12-18. The number of wash steps, composition of the aqueous wash medium, wash duration, wash ratio (as pbw starting non-derivatized) guar:pbw wash medium), washed splits moisture content (following separation from aqueous wash medium and prior to drying), viscosity of a 1% aqueous solution of the derivatized guar and the viscosity of a shampoo formulation containing the derivatized guar are given of each of the derivatized guars of Examples 12-18. The shampoo formulation contained water and the following ingredients in the following relative amounts:

| Ingredient | pbw per 100 pbw shampoo formulation |
|---|---|
| cocoamidopropyl betaine | 2 |
| sodium lauryl sulphate | 14 |

-continued

| Ingredient | pbw per 100 pbw shampoo formulation |
|---|---|
| sodium chloride | 1.6 |
| guar gum | 0.3 |
| methylchloroisothiazolinone and methylisothiazolinone | 0.05 |
| citric acid | as needed to adjust pH |

TABLE II

| Ex# | Wash Composition/Contact Time/Ratio | | Washed Splits Moisture Content (%) | Viscosity (cP, 1% water) | Viscosity (cP, Personal care composition) |
|---|---|---|---|---|---|
| | Wash 1 | Wash 2 | | | |
| 12 | 2% NaCl/ 2 min/10:1 | 2% NaCl/ 2 min/10:1 | 69.6 | 3150 | 3880 |
| 13 | 2% NaCl/ 2 min/20:1 | 2% NaCl/ 2 min/20:1 | 74.8 | 3260 | 4200 |
| 14 | 2% NaCl/ 2 min/10:1 | Water/ 2 min/10:1 | 71.7 | 3470 | 3920 |
| 15 | 2% NaCl/ 2 min/20:1 | Water/ 2 min/20:1 | 76.2 | 3165 | 4240 |
| 16 | Water[a]/ 2 min/10:1) | Water/ 2 min/10:1 | 77.9 | 3170 | 3300 |
| 17 | Water/ 2 min/10:1 | Water/ 2 min/10:1 | 73.1 | 3580 | 4130 |
| 18 | 2% NaCl/ 2 min/20:1 | Water/ 2 min/20:1 | 76.2 | 3165 | 4240 |

[a]2% NaCl, added as brine prior to water wash

Examples 19 and 20 and Comparative Example C3

The derivatized guar gums of Examples 19 and 20 were according to the method used to make the derivatized guar gum of Examples 17 above, except that four wash steps, each of shorter duration than the two wash steps used for Examples 17, were used. Comparative Example 3 was made using a borax crosslinked guar gum that was then subjected to two wash steps, that is, by method analogous to that used in Example 18 above.

The number of wash steps, composition of the aqueous wash medium, wash duration, wash ratio (as pbw starting non-derivatized) guar:pbw wash medium), washed splits moisture content (following separation from aqueous wash medium and prior to drying), are given in Table III below for each of the derivatized guars of Examples 19 and 20 and Comparative Example 3.

TABLE III

| Ex# | Boron cross-link | Wash Composition/Contact Time/Ratio | | | | Washed Splits Moisture Content (%) |
|---|---|---|---|---|---|---|
| | | Wash 1 | Wash 2 | Wash 3 | Wash 4 | |
| 19 | no | Water/ 1 min/ 10:1 | Water/ 1 min/ 10:1 | Water/ 1 min/ 10:1 | Water/ 1 min/ 10:1 | 73.4 |
| 20 | no | 2% NaCl/ 2 min/ 20:1 | 2% NaCl/ 2 min/ 20:1 | Water/ 1 min/ 10:1 | Water/ 1 min/ 10:1 | 79. |
| C3 | Yes | Water/ 2 min/ 20:1 | Water/ 2 min/ 20:1 | — | — | 78.4 |

The hydration rate of the derivatized guar gums of Examples 19 and 20 and Comparative Examples 3 were evaluated by monitoring the viscosity of a composition comprising water and 1 wt % of the derivatized guar gum described below.

Each of the 1 wt % aqueous mixtures of the guar gums of Example 19, Example 20, or Comparative Example 3 was made by adding 3 grams of the particulate derivatized guar gum to 297 grams demineralized water in a 400 milliliter beaker with magnetic stirring.

In a first study, the magnetic stirring was continued for 15 minutes after addition of the derivatized guar gum, and then the magnetic stirring was stopped.

In as second hydration study, the mixing was continued for 15 minutes, 30 minutes, 60 minutes, 90 minutes, or 120 minutes.

In each case, the viscosity of each of the mixtures comprising water and the derivatized guar gum of Example 19, Example 20, and Comparative Example 3 was measured, using a Brookfield viscometer (at a rotation speed of 100 rpm and the spindle 2 or 20 rpm spindle 3, as appropriate for the viscosity range), immediately after magnetic stirring was stopped and then at 2 hours, 4 hours, and 24 hours after the time magnetic stirring was stopped The results of the first hydration study are given in Table IV below for each of the 1 wt % aqueous mixtures of the derivatized guar gums of Example 19, Example 20, and Comparative Example 3, as pH and the viscosity in milliPascal seconds (mPa·s) immediately after stirring was stopped and then at 2 hours, 4 hours, and 24 hours after the time magnetic stirring was stopped.

TABLE IV

| EX # | pH | Viscosity (mPa · s), by time elapsed after stirring stopped | | | |
|---|---|---|---|---|---|
| | | Immediately | 2 hours | 4 hours | 24 hours |
| 19 | 10.73 | 72 | 2710 | 3270 | 3800 |
| 20 | 10.13 | 294 | 3575 | 3750 | 4060 |
| C3 | 10.86 | 13[a] | 12.8[a] | 12.8[a] | 12.8[a] |

[a]two phases present

Referring to the results provide in Table IV above, the particulate derivatized guar gums of Examples 19 and 20 hydrated rapidly in water at a pH of greater than 10 to give a stable, single phase aqueous mixture and provided a significant increase in the viscosity after 15 minutes of magnetic stirring. The respective viscosities of the aqueous mixtures of the derivatized guar gums of Examples 19 and 20 continued to increase over the next 24 hours. In contrast, the particulate, boron-crosslinked, derivatized guar dispersed in the aqueous medium but provided only a very modest increase in viscosity after 15 minutes of magnetic stirring and formed gelatinous agglomerates of particles that remained undissolved and, after cessation of stirring, partitioned from the aqueous medium as a separate gelatinous phase.

The results of the second hydration study are given in Table V below for each of the 1 wt % aqueous mixtures of the derivatized guar gums of Example 19, Example 20, and Comparative Example 3, as pH, time for the derivatized guar gum to disperse in the water, and the viscosity in milliPascal seconds (mPa·s) immediately after cessation of 15 minutes, 30 minutes, 60 minutes, 90 minutes, or 120 minutes of magnetic stirring, and 24 hours after 120 minutes of magnetic stirring.

TABLE V

| EX # | pH | Time to disperse (s) | Viscosity (mPa · s) immediately after stirring, by duration of stirring time | | | | | Viscosity (mPa · s) 1 day after stirring stopped |
|---|---|---|---|---|---|---|---|---|
| | | | 15 min | 30 min | 60 min | 90 min | 120 min | |
| 19 | 10.73 | 67 | 69 | 188 | 1000 | 2140 | 2920 | 4110 |
| 20 | 10.13 | 63 | 172 | — | 1640 | 2980 | 3355 | 4090 |
| C3 | 10.89 | 21[a] | 13[a] | 14[a] | 14[a] | 14[a] | 14.8[a] | 14[a] |

[a]two phases present

Referring to the results provide in Table V above, the particulate derivatized guar gums of Examples 19 and 20 hydrated rapidly in water at a pH of greater than 10 to give a stable, single phase aqueous mixture and provided a significant increase in the viscosity after 15 minutes of magnetic stirring. The respective viscosities of the aqueous mixtures of the derivatized guar gums of Examples 19 and 20 continued to increase with longer stirring, and the viscosity continued to increase over the next 24 hours after cessation of stirring. In contrast, the particulate, boron-crosslinked, derivatized guar dispersed in the aqueous medium but provided only a very modest increase in viscosity after 15 minutes of magnetic stirring and formed gelatinous agglomerates of particles that remained as a separate phase in the aqueous medium. The viscosity did not increase with longer stirring and did not increase over the next 24 hours after cessation of stirring. The gelatinous agglomerates of particles remained undissolved and after cessation of stirring partitioned from the aqueous medium as a separate gelatinous phase.

The invention claimed is:

1. A method for making derivatized guar, comprising:
    reacting guar splits with a derivatizing reagent in an aqueous medium under appropriate reaction conditions to produce derivatized guar splits, wherein neither the guar splits nor the derivatized guar splits are treated to crosslink the guar splits or derivatized guar splits,
    washing the derivatized guar splits with from about 2 to about 30 kilograms per kilogram of derivatized guar splits of an aqueous salt solution comprising water and, based on 100 parts by weight of the salt solution, from about 0.1 to about 30 parts by weight of a water soluble non-boron salt having a monovalent cation, and
    separating washed derivatized guar splits from the aqueous salt solution by filtration, centrifugation, or filtration and centrifugation, wherein the washed derivatized guar splits have, after separation from the aqueous salt solution and prior to drying, a water content of less than or equal to 80 percent by weight, and
    drying the washed derivatized guar splits.

2. The method of claim 1, further comprising:
    grinding the washed derivatized guar splits to form particles of derivatized guar gum.

3. The method of claim 1, wherein water soluble non-boron salt is potassium chloride or sodium chloride.

4. The method of claim 1, wherein the method comprises washing the derivatized guar splits with from about 5 to about 15 kilograms per kilogram of derivatized guar splits of an aqueous salt solution comprising water and from about 0.1 to about 10 parts by weight of a water soluble non-boron salt having a monovalent cation.

* * * * *